United States Patent
Esfahany

(10) Patent No.: US 7,603,327 B2
(45) Date of Patent: Oct. 13, 2009

(54) SYSTEM AND METHOD FOR MANAGING OBJECT BASED CLUSTERS

(75) Inventor: Kouros H. Esfahany, Huntington, NY (US)

(73) Assignee: Computer Associates Think, Inc., Islandia, NY (US)

(*) Notice: Subject to any disclaimer, the term of this patent is extended or adjusted under 35 U.S.C. 154(b) by 522 days.

(21) Appl. No.: 10/190,759

(22) Filed: Jul. 8, 2002

(65) Prior Publication Data

US 2003/0214525 A1    Nov. 20, 2003

Related U.S. Application Data

(60) Provisional application No. 60/303,425, filed on Jul. 6, 2001.

(51) Int. Cl.
*G06E 1/00* (2006.01)
*G06E 3/00* (2006.01)
*G06G 7/00* (2006.01)
*G06N 3/02* (2006.01)

(52) U.S. Cl. .............................. 706/15; 706/16; 706/26

(58) Field of Classification Search ................. 706/15, 706/16, 26, 18; 382/104; 719/310, 130; 700/18
See application file for complete search history.

(56) References Cited

U.S. PATENT DOCUMENTS

| | | | | |
|---|---|---|---|---|
| 5,742,762 | A | 4/1998 | Scholl et al. ............. | 395/200.3 |
| 5,870,559 | A | 2/1999 | Leshem et al. .......... | 395/200.54 |
| 5,889,523 | A * | 3/1999 | Wilcox et al. ............ | 715/854 |
| 6,115,646 | A * | 9/2000 | Fiszman et al. .......... | 700/181 |
| 6,122,664 | A | 9/2000 | Boukobza et al. | |
| 6,145,001 | A | 11/2000 | Scholl et al. ............ | 709/223 |
| 6,178,529 | B1 | 1/2001 | Short et al. | |
| 6,226,273 | B1 | 5/2001 | Busuioc et al. | |
| 6,304,864 | B1 * | 10/2001 | Liddy et al. ............ | 706/15 |
| 6,331,858 | B2 | 12/2001 | Fisher ...................... | 345/582 |
| 6,430,592 | B1 | 8/2002 | Davison ................... | 709/103 |
| 6,530,840 | B1 * | 3/2003 | Cuomo et al. ............ | 463/42 |
| 6,691,176 | B1 | 2/2004 | Narin et al. .............. | 709/318 |
| 6,848,104 | B1 * | 1/2005 | Van Ee et al. ............ | 719/310 |
| 6,853,738 | B1 * | 2/2005 | Nishigaki et al. ......... | 382/106 |
| 2001/0028729 | A1 * | 10/2001 | Nishigaki et al. ......... | 382/104 |
| 2002/0091702 | A1 | 7/2002 | Mullins .................... | 707/100 |

(Continued)

FOREIGN PATENT DOCUMENTS

WO    WO 01/38992 A2    5/2001

(Continued)

OTHER PUBLICATIONS

Omer F. Rana et al, Resource Discovery for Dynamic Clusters in Computational Grids, 2001, IEEE, 759-767.*

(Continued)

*Primary Examiner*—David R Vincent
*Assistant Examiner*—Benjamin Buss
(74) *Attorney, Agent, or Firm*—Baker Botts L.L.P.

(57) ABSTRACT

A method, system, API, GUI, and computer readable media for managing object-based clusters is provided. The method provides a computer executable methodology for discovering, monitoring, and managing object-based clusters. The system provides a computer-based system for facilitating interactions with heterogeneous cluster solutions. The system includes computer components for detecting clusters and supervising detected clusters and/or components.

30 Claims, 10 Drawing Sheets

U.S. PATENT DOCUMENTS

| | | | | |
|---|---|---|---|---|
| 2002/0184171 | A1* | 12/2002 | McClanahan | 706/20 |
| 2003/0158884 | A1 | 8/2003 | Alford, Jr. | 709/104 |
| 2004/0221121 | A1 | 11/2004 | Hamilton, II et al. | 711/170 |
| 2004/0250248 | A1 | 12/2004 | Halpern et al. | 718/100 |
| 2005/0015661 | A1 | 1/2005 | Vaidyanathan | 714/13 |
| 2005/0044301 | A1 | 2/2005 | Vasilevsky et al. | 711/1 |
| 2005/0081201 | A1 | 4/2005 | Aguilar et al. | 718/100 |
| 2005/0120160 | A1 | 6/2005 | Plouffe et al. | 711/1 |
| 2005/0131941 | A1 | 6/2005 | Dettinger et al. | 707/104.1 |
| 2005/0132362 | A1 | 6/2005 | Knauerhase et al. | 718/1 |
| 2005/0262504 | A1 | 11/2005 | Esfahany et al. | 718/1 |
| 2005/0262505 | A1 | 11/2005 | Esfahany et al. | 718/1 |
| 2005/0289145 | A1 | 12/2005 | Voegel | 707/9 |
| 2007/0055647 | A1 | 3/2007 | Mullins et al. | 707/2 |
| 2007/0079308 | A1 | 4/2007 | Chiaramonte et al. | 718/1 |
| 2007/0094367 | A1 | 4/2007 | Esfahany et al. | 709/223 |
| 2007/0266136 | A1 | 11/2007 | Esfahany et al. | 709/223 |

FOREIGN PATENT DOCUMENTS

| | | |
|---|---|---|
| WO | WO 02/088938 A1 | 11/2002 |
| WO | WO 03/071424 A2 | 8/2003 |
| WO | WO 2003/088046 A1 | 10/2003 |

OTHER PUBLICATIONS

Jeannette Lawrence, Introduction to Neural Networks, 1994 California Scientific Software Press, 6th edition, 18, 28.*

Communication—Supplementary European Search Report in Application No. 02752185.5-1243, dated Apr. 27, 2007, received Jun. 19, 2007, 4 pages.

Omer F. Rana et al., "Resource Discovery for Dynamic Clusters in Computational Grids," XP-002429542, IEEE, 2001, 9 pages.

PCT, Notification of Transmittal of the International Search Report and the Written Opinion of the International Searching Authority, or the Declaration, PCT/US2006/040918 (10 pgs.), Date Mailed Jan. 31, 2007.

Platform Computing, Inc., "An Introduction to Platform VM Orchestrator. Extract More Value from a Virtual Server Environment Through Automated Management", XP002415478, (13 pgs.), Oct. 1, 2005.

Gamma, et al., "Design Patterns Elements of Resusable Object-Oriented Software", XP002261440, (24 pgs.), 1997.

VMware, Inc., "VMware VirtualCenter User's Manual Version 1.0", XP002407050, retrieved from the internet http://www.vmware.com/pdf/VirtualCenter_Users_Manual.pdf, retrieved on Aug. 16, 2005, (143 pgs.).

Govil, et al., "Cellular Disco: Resource Management Using Virtual Clusters on Shared-Memory Multiprocessors", Operating Systems Review, ACM, vol. 33, No. 5, pp. 154-169, ACM 1-58113-140-2, Dec. 1999 (XP000919655), Dated Dec. 5, 2005, (16 pgs.).

Notification of Transmittal of the International Search Report and the Written Opinion of the International Searching Authority, or the Declaration; International Application No. PCT/US2005/014269 dated Nov. 16, 2005 (11 pgs).

Notification of Transmittal of the International Search Report and the Written Opinion of the International Searching Authority, or the Declaration; International Application No. PCT/US2005/014270 dated Aug. 8, 2005 (12 pgs).

PCT, Notification of Transmittal of the International Search Report and the Written Opinion of the International Searching Authority, or the Declaration; International Application No. PCT/US2006/038055; date mailed Feb. 1, 2007 (12 pgs).

EPO Communication Pursuant to Article 96(2) EPC, Application No. 05 739 911.5-1243; Ref. HCD/J00049340EP, (6 pgs), Sep. 6, 2007.

Intel; White paper; Easy-attach Storage, making SAN Affordable (8 pgs), 2004.

White Paper; Building Virtual Infrastructure with VMware VirtualCenter; Vitual Infrastructure Software for the Responsive Enterprise; vmware, (10 pgs), 2004.

Computer Associates; Unicenter NSM Dynamic Reconfiguration Option; Complete Management Solution for High-End to Mid-Range Servers (24 pgs), 2003.

Computer Associates; Unicenter NSM Dynamic Reconfiguration Option; Complete Management Solution for High-End to Mid-Range Servers (updated Apr. 22, 2003) (28 pgs).

Computer Associates; Unicenter NSM Dynamic Reconfiguration Option; Getting Started Guide 3.0 (25 pgs), Apr. 2003.

Computer Associates; Unicenter NSM Dynamic Reconfiguration Option; Managing On-Demand Computing (59 pgs), Jun. 26, 2003.

Computer Associates; Unicenter Dynamic Reconfiguration Option; (1 pg), 2003.

Computer Associates; Unicenter NSM Dynamic Reconfiguration Option 3.0; High-End & Midframe Server Discovery, Monitoring & Administration Solution; CA Development Buddy Program (10 pgs), 2003.

Computer Associates; Managing Enterprise Clusters and Dynamic System Domains, Session Code: ENT07SN (47 pgs), 2003.

Managing Dynamic System Domains with Unicenter DRO (22 pgs), 2003.

Computer Associates; Unicenter Advanced Systems Management (UASM) r11 (47 pgs), 2005.

USPTO Office Action for U.S. Appl. No. 11/435,347, filed May 15, 2006; Inventor: Kouros H. Esfahany; (10 pgs), Apr. 22, 2008.

* cited by examiner

SYSTEM AND METHOD FOR MANAGING OBJECT BASED CLUSTERS

CROSS REFERENCE TO RELATED APPLICATIONS

This application claims priority to U.S. provisional application entitled "System and Method for Managing Object-Based Clusters," Ser. No. 60/303,425, filed Jul. 6, 2001.

TECHNICAL FIELD

The method, system, application programming interface (API), graphical user interface (GUI), and computer readable media described herein relate generally to information and data management and more particularly to managing object-based clusters.

BACKGROUND

A cluster is a group of independent computer components coupled by software and/or hardware that facilitates the components working together as a single system. Clusters facilitate keeping applications highly available and performing failover processing through migration within a cluster. Clusters are typically less expensive than conventional parallel systems (e.g., symmetric multi-processing (SMP), massively parallel processing (MPP), non-uniform memory access (NUMA), mainframe). Clusters have typically been managed manually and individually. It has conventionally been difficult, if possible at all, to manage more than one cluster because of problems associated with vendor specific hardware, software, and protocols, and platform specific hardware, software, and protocols, and interactions. Since cluster management has conventionally been difficult to perform, operator errors associated with cluster management have occurred. Thus, improvements in cluster management are still desired.

SUMMARY

The following presents a simplified summary of managing object-based clusters to provide a basic understanding of some aspects of such management. This summary is not an extensive overview and is not intended to identify key or critical elements of the methods, systems, APIs, GUIs, computer readable media and so on or to delineate the scope of such items. It conceptually identifies managing object-based clusters in a simplified form as a prelude to the more detailed description that is presented later.

This application concerns systems and methods for object-based cluster management (OBCM) that automatically discover, monitor, and manage cluster objects across multiple, heterogeneous cluster environments. Similarly, OBCM may automatically discover, monitor, and manage resources associated with cluster objects. OBCM facilitates reporting out information obtained concerning clusters and/or resources. Similarly, OBCM facilitates reporting out actions taken concerning clusters and/or resources.

One aspect of the application concerns a method for managing object based clusters. The method includes discovering clusters and storing values associated with the clusters in objects that model a cluster. The method further includes receiving and analyzing data from agents, where the data concerns the clusters and/or resources. Another example method includes monitoring the clusters and/or resources and updating the stored values associated with the clusters and/or resources. Yet another example method includes managing the clusters and/or resources.

Another aspect of this application concerns a system for facilitating interaction with heterogeneous cluster solutions. The system includes a cluster detector that detects clusters and a cluster supervisor that collects data from the clusters. In one example system, the cluster detector and/or cluster supervisor communicate with objects through a standardized, normalized command set.

Yet another aspect of this application concerns a set of objects that facilitates object-based cluster management. The set of objects includes a parent object that models a managed object, a cluster object that inherits from the parent object and models a cluster and vendor cluster objects that inherit from the cluster object and model vendor specific cluster solutions.

Still yet another aspect of this application concerns a computer system having a graphical user interface comprising a display and a selection device. The graphical user interface employs a method of providing and selecting from a set of data entries on the display. The method includes retrieving a set of data entries, each of the data entries representing a cluster management option, displaying the set of data entries on the display, receiving a data entry selection signal indicative of the selection device selecting a selected data entry, and in response to the signal, initiating a cluster management operation associated with the selected data entry.

Another aspect of the application concerns a set of application program interfaces embodied on a computer readable medium for execution by a computer component in conjunction with an application program that facilitates object based cluster management. The set of application program interfaces includes a first interface that receives and returns at least one of an application data and a control data associated with discovering a cluster, a second interface that receives and returns at least one of an application data and a control data associated with monitoring a cluster, and a third interface that receives and returns at least one of an application data and a control data associated with managing a cluster.

Thus, certain illustrative aspects of managing object-based clusters are described herein in connection with the following description and the annexed drawings. These aspects are indicative, however, of but a few of the various ways in which the principles of managing object-based clusters may be employed and thus are intended to include such aspects and equivalents. Other advantages and novel features may become apparent from the following detailed description when considered in conjunction with the drawings.

DETAILED DESCRIPTION

Figure 1:
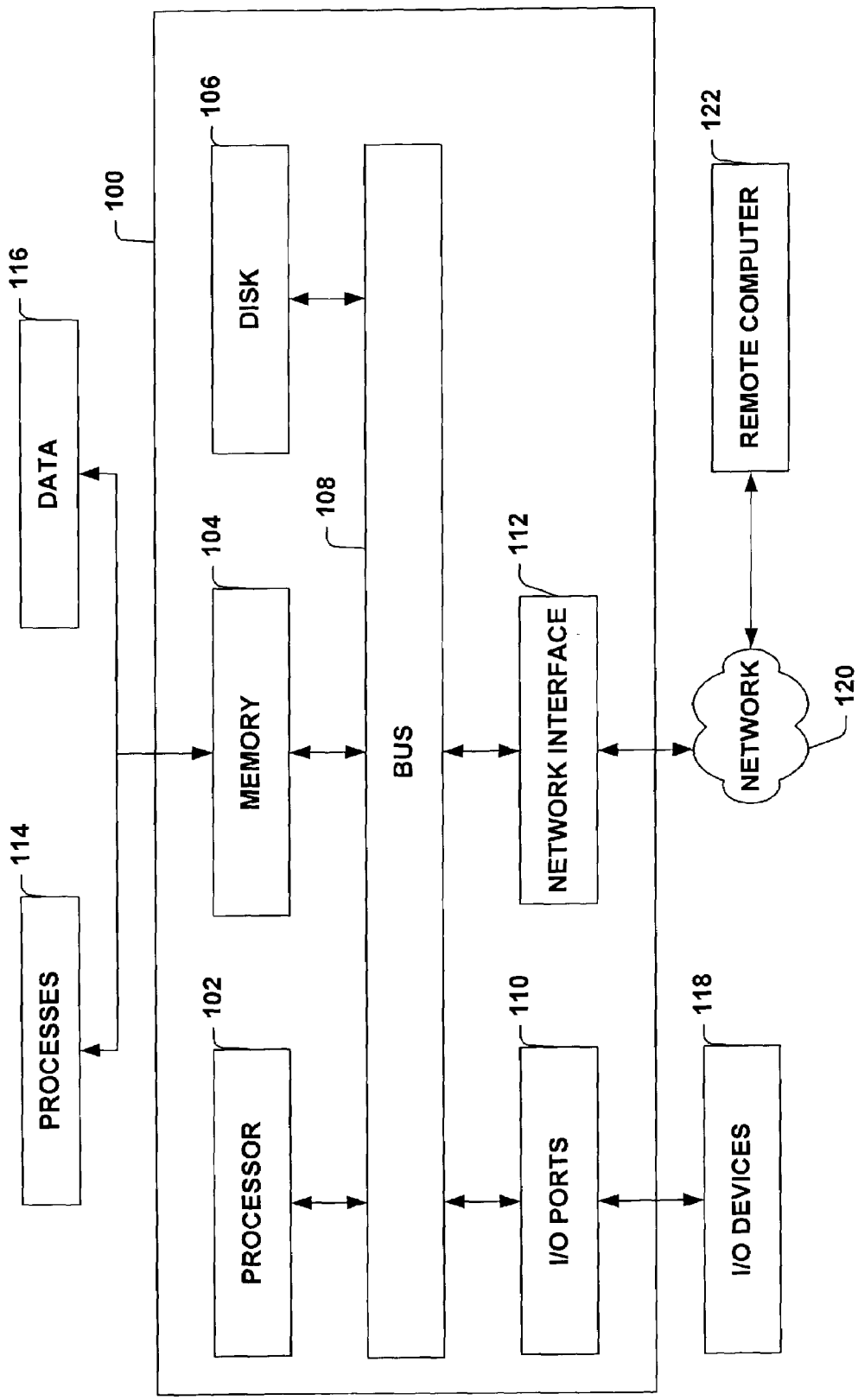
FIG. 1 illustrates an example computing environment on which the example systems, methods, GUIs, and APIs described herein could be implemented.

The methods, systems, APIs, GUIs, and computer readable media are now described with reference to the drawings, where like reference numerals are used to refer to like elements throughout. In the following description for purposes of explanation, numerous specific details are set forth in order to facilitate thoroughly understanding managing object-based clusters. It may be evident, however, that the methods, systems, APIs, GUIs, and computer readable media can be practiced without these specific details. In other instances, well-known structures and devices are shown in block diagram form in order to simplify description.

FIG. 1 illustrates a computer 100 that includes a processor 102, a memory 104, a disk 106, input/output ports 110, and a network interface 112 operably connected by a bus 108. Executable components of the systems described herein may be located on a computer like computer 100. Similarly, computer executable methods described herein may be performed on a computer like computer 100. It is to be appreciated that other computers may also be employed with the example systems and methods described herein. The processor 102 can be a variety of various processors including dual microprocessor and other multiprocessor architectures. The memory 104 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM). The disk 106 can include, but is not limited to, devices like a magnetic disk drive, a floppy disk drive, a tape drive, a Zip drive, a flash memory card, and/or a memory stick. Furthermore, the disk 106 can include optical drives like, a compact disk ROM (CD-ROM), a CD recordable drive (CD-R drive), a CD rewriteable drive (CD-RW drive) and/or a digital versatile ROM drive (DVD ROM). The memory 104 can store processes 114 and/or data 116, for example. The disk 106 and/or memory 104 can store an operating system that controls and allocates resources of the computer 100.

The bus 108 can be a single internal bus interconnect architecture and/or other bus architectures. The bus 108 can be of a variety of types including, but not limited to, a memory bus or memory controller, a peripheral bus or external bus, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 100 interacts with input/output devices 118 via input/output ports 110. Input/output devices 118 can include, but are not limited to, a keyboard, a microphone, a pointing and selection device, cameras, video cards, displays, and the like. The input/output ports 110 can include but are not limited to, serial ports, parallel ports, and USB ports.

The computer 100 can operate in a network environment and thus is connected to a network 120 by a network interface 112. Through the network 120, the computer 100 may be logically connected to a remote computer 122. The network 120 includes, but is not limited to, local area networks (LAN), wide area networks (WAN), and other networks. The network interface 112 can connect to local area network technologies including, but not limited to, fiber distributed data interface (FDDI), copper distributed data interface (CDDI), ethernet/IEEE 802.3, token ring/IEEE 802.5, and the like. Similarly, the network interface 112 can connect to wide area network technologies including, but not limited to, point to point links, and circuit switching networks like integrated services digital networks (ISDN), packet switching networks, and digital subscriber lines (DSL).

Figure 2:
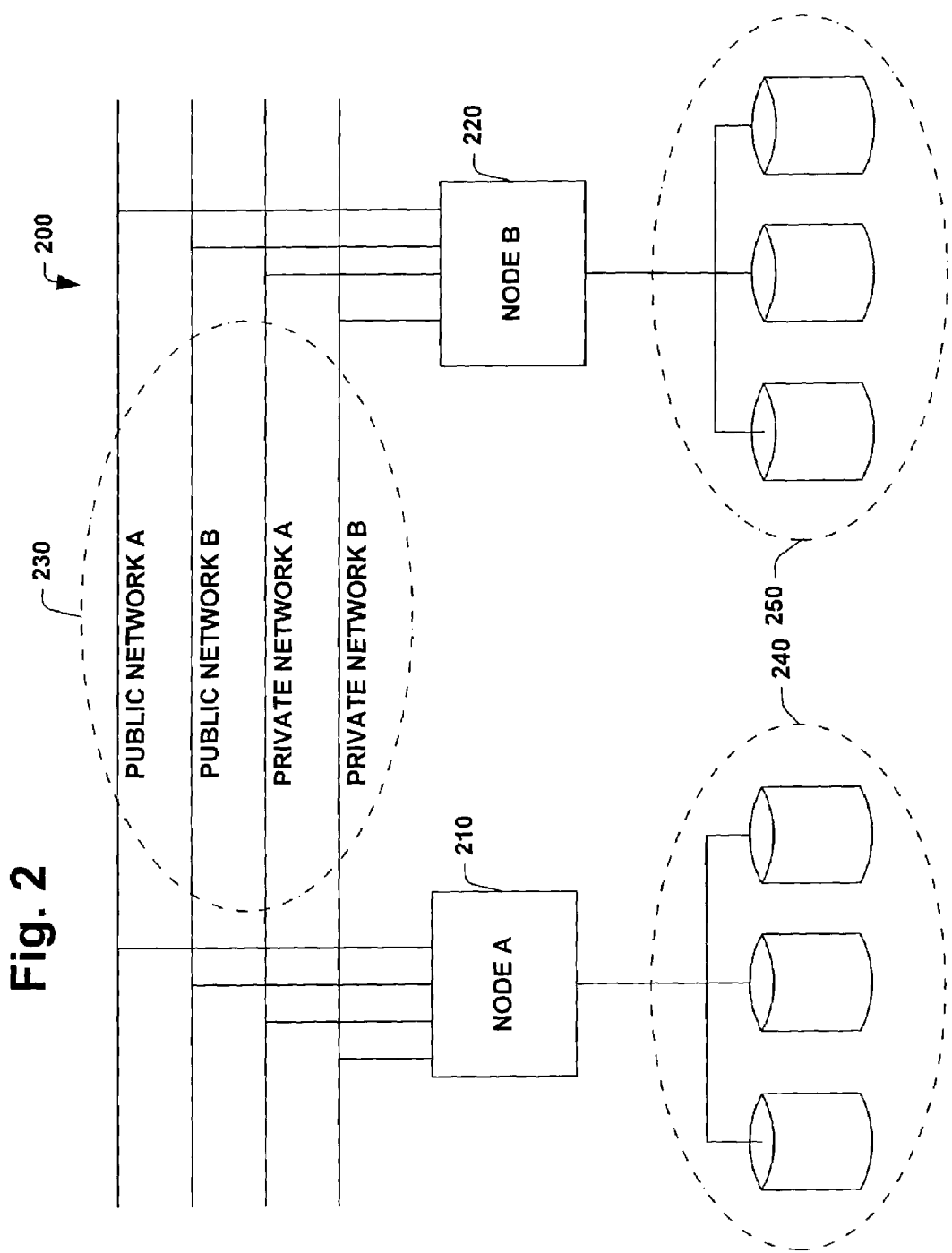
FIG. 2 illustrates a typical two node cluster.

Referring now to FIG. 2, a typical computer cluster 200 is illustrated. A computer cluster is a collection of independent computer systems interconnected for use as a single, unified computing resource. Computer clusters are highly available, scaleable, and affordable and help create a virtual system image through clustering software. Membership in a computer cluster is dynamic. Computer clusters may interact with cluster resources. Cluster resources are a collection of shared resources, such as Internet Protocol (IP) addresses, disk volumes, and applications. Cluster resources are scaleable, shared, and facilitate providing dynamic ownership. A cluster package is a collection of cluster resources bundled to provide highly available services that facilitate a designated usage of cluster resources. A cluster package is typically scaleable and highly available with a dynamic location.

In the cluster 200, a first node 210 and a second node 220 are illustrated communicating through a set of networks 230. Networks 230 can include public networks and private networks and may provide access to entities including, but not limited to, object based cluster managers, GUIs, systems programs and applications. The first node 210 is illustrated in communication with a set of cluster resources 240. Similarly, the cluster 220 is illustrated in communication with a set of cluster resources 250. The sets of cluster resources 240 and 250 may be arranged in cluster packages. The cluster 200 may be employed, for example, in providing disk services to an enterprise. The enterprise, rather than interacting directly with the clusters, may interact with the clusters through an object-based cluster management system.

Figure 3:
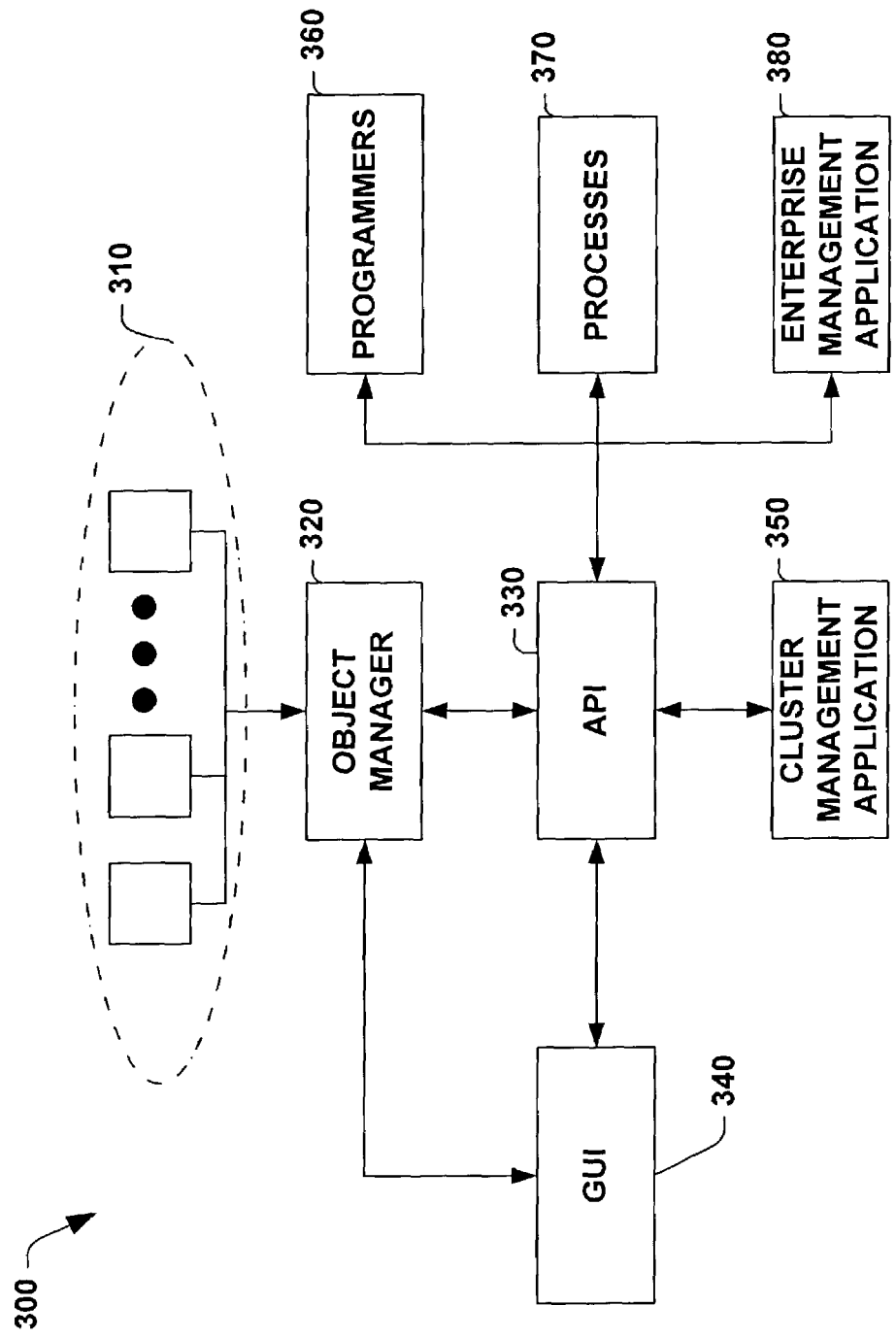
FIG. 3 illustrates an example system for facilitating interaction with heterogeneous cluster solutions by managing object-based cluster solutions.

Turning now to FIG. 3, an example system 300 that includes an object-based cluster manager 320 and a cluster management application 350 is illustrated. The object-based cluster manager 320 interacts with a cluster 310 that is modeled by one or more objects. OBCM assumes that clusters, cluster components, and resources are modeled by objects. Modeling clusters as cluster objects is facilitated by organizing objects in an object framework that simplifies interacting with parent cluster objects and objects that derive therefrom. A graphical user interface simplifies viewing clusters, resources, and information associated therewith. An API simplifies the task of programmers and/or processes that interact with an object based cluster manager. Thus, the application concerns simplifying cluster management and facilitating substantially simultaneously managing more than one heterogeneous cluster by overcoming interoperability problems.

An "object" can be, for example, a self-contained entity that can include both data and methods to manipulate the data. Generally, the data is exposed or made accessible via an interface of methods. Objects facilitate abstracting logical and physical entities in software, and hiding the information and details of an abstraction inside an object while exposing a world view via an interface. Objects are typically arranged in a hierarchy that facilitates inheritance and other object oriented programming techniques.

The system 300 includes a graphical user interface (GUI) 340 that facilitates viewing the cluster 310, components of the cluster 310, and/or other enterprise information. Furthermore, the GUI 340 may display information about the object manager 320. For example, the GUI 340 may display information concerning which clusters, components, and resources, if any, with which the object manager 320 is in contact. Similarly, the GUI 340 may display commands that represent available actions that the object manager 320 can take. In one example, the GUI 340 may communicate with agents (e.g., discovery, monitor, managing) through a Transmission Control Protocol/Internet Protocol (TCP/IP) protocol. Furthermore, the GUI 340 can display multiple cluster sessions substantially simultaneously. Thus, the GUI 340 simplifies interacting with clusters and managing clusters by facilitating issuing commands through, for example, mouse clicks rather than command line syntax. Furthermore, the GUI 340 simplifies cluster management by providing configurable, pop-up menus that may be sensitive to the context and/or state of a cluster. "Cluster visualization" refers to the process of representing cluster related objects in a graphical user interface, for example, an enterprise viewing application. Cluster visualization employs a set of distinctive icons to represent cluster related objects in graphical user interface displays. Such icons may be color coded to facilitate indicating a cluster status, a cluster membership, services available at the cluster, and resources associated with the cluster, for example.

In one example, the GUI 340 may include a display and a selection device. Thus, data entries can be displayed on the display, and selections between the data entries may be made. For example, the GUI 340 can display data entries that represent cluster management operations that may be performed by the object manager 320 on the cluster 310. The cluster management operations can include, but are not limited to, defining a cluster, defining a cluster component, viewing a cluster, viewing a cluster component, calling a function on a cluster, calling a function on a cluster component, invoking a process on a cluster, invoking a process on a cluster component, sending a command to a cluster, sending a command to a cluster component, starting a cluster, starting a cluster component, halting a cluster, halting a cluster component, starting a failover process, stopping a failover process, starting a maintenance process, stopping a maintenance process, starting a load balancing process, and stopping a load balancing process, for example. Therefore, the GUI 340 facilitates interacting with the cluster 310. By the GUI 340 retrieving from the object manager 320 a set of data entries associated with, for example, cluster management operations, the GUI 340 can be flexible, providing advantages over conventional, hard coded systems. By displaying the set of data entries retrieved from the object manager 320 on the GUI 340, and receiving a data entry selection signal that indicates the selected data entry, the GUI 340 facilitates initiating cluster management operations through graphical operations rather than conventional command line operations, providing advantages over conventional text based systems (e.g., ease of use, memory reminders, shorter learning curve).

The system 300 also includes an API 330. The API 330 can include, for example, an interface that facilitates receiving and returning application data and control data to and from the object manager 320. Similarly, the API 330 facilitates receiving and/or returning application data and/or control data associated with monitoring the cluster 310. Furthermore, the API 330 may include an interface that facilitates receiving and returning application data and/or control data associated with managing the cluster 310. Therefore, applications and entities including, but not limited to, a cluster management application 350, programmers 360, processes 370, and an enterprise management application 380 may interact with the cluster 310 through the API 330 interacting with the object manager 320. Thus, applications, programmers, and processes are isolated from not only the vendor specific hardware, software and communications protocols inherent in heterogeneous clusters, but also from the internals of the object manager 320. Applications, programmers and processes need only learn the interface to the API 330 to interact with the cluster 310 and/or the object manager 320. This provides advantages over conventional systems where applications, programmers, and processes were forced to learn the internal details of the cluster 310, and/or associated cluster components, and resources. Another advantage to interacting with the object manager 320 through the API 330 is that implementation changes made to the object manager 320 are less likely to require recoding of entities that interact with the object manager 320 through the API 330, so long as the object manager 320 continues to support the API 330.

In one example, the object manager 320 provides means for identifying one or more heterogeneous clusters 310. Once heterogeneous clusters have been identified, information concerning clusters can be displayed through the GUI 340. Similarly, commands may be sent to the heterogeneous clusters from the GUI 340 and data concerning the clusters can be retrieved via the API 330. The object manager 320 may also provide means for surveying the heterogeneous clusters, which includes identifying data values, identifying changes in data values, and identifying cluster components and/or resources associated with such heterogeneous clusters. Thus, a cluster management application 350 may, through the API 330, interact with the data retrieved while surveying the heterogeneous clusters by the object manager 320. The object manager 320 may be aided in surveying the heterogeneous clusters by one or more agents (e.g., neural network surveying agents).

Since the cluster 310 can have vendor specific qualities, a system for controlling heterogeneous clusters may benefit from including means for abstracting a cluster where the means may include, but are not limited to, objects and/or a hierarchy of objects that facilitate modeling clusters, cluster components and/or resources. Since various entities, for example, cluster management applications 350, programmers 360, processes 370, and enterprise management applications 380 may desire to interact with the cluster 310, a system for controlling heterogeneous clusters may benefit from including means for controlling heterogeneous clusters through a standardized command set. Thus, so long as a cluster vendor implements the back end of the standardized command set, the applications, programmers, and processes can interact with the front end of the command set, providing advantages over conventional systems wherein such applications, programmers, and processes must interact directly with the vendor specific commands provided in a cluster.

It is to be appreciated that the object manager 320 may include a cluster detecting component and a cluster supervising component. It is to be further appreciated that the cluster detecting components and/or cluster supervising components may include computer executable components that are stored on a computer readable medium. Similarly, methods for managing object based clusters that include discovering clusters, storing cluster data in cluster modeling objects, updating cluster modeling objects, and managing clusters may be implemented in computer executable instructions that are similarly stored on a computer readable medium.

Figure 4:
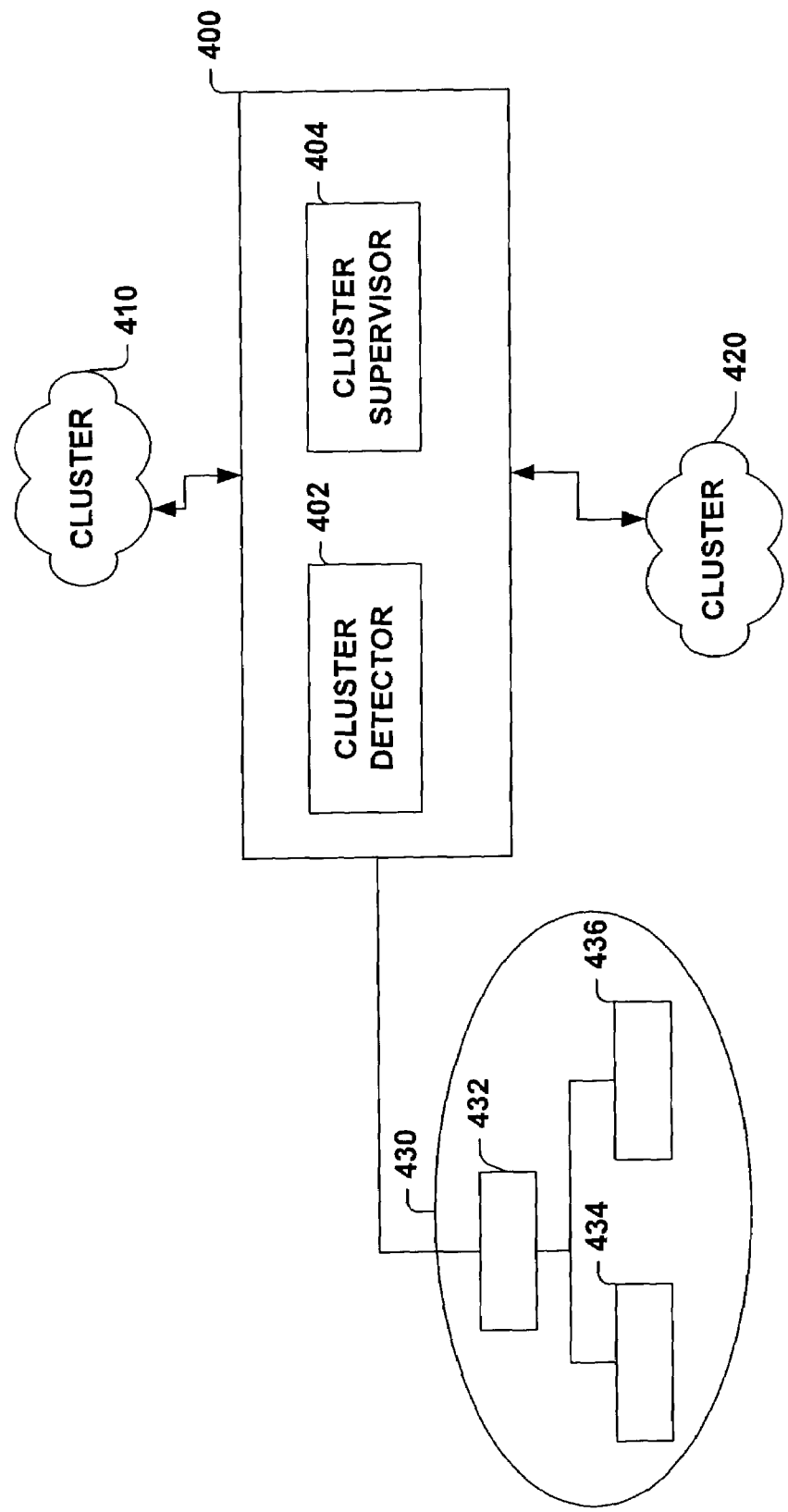
FIG. 4 illustrates an example system for facilitating interaction with heterogeneous cluster solutions.

Turning now to FIG. 4, a system 400 that facilitates interacting with heterogeneous cluster solutions is illustrated. The system 400 includes a cluster detector 402 and a cluster supervisor 404. The cluster detector 402 facilitates detecting heterogeneous clusters like cluster 410 and cluster 420. Cluster 410 may be, for example, from a first vendor that has vendor specific hardware, software, and protocols. Similarly, cluster 420 may be from a different vendor and thus may have a different set of vendor specific hardware, software, and communication protocols. Conventionally, interacting with heterogeneous clusters required accounting for vendor specific hardware, software, and/or protocols. However, by modeling clusters in objects, systems can interact with the abstracted objects rather than the vendor specific items. Therefore, the system 400 can interact with objects that model clusters and an object hierarchy that facilitates interacting with heterogeneous cluster solutions. The cluster supervisor 404 can collect data from the one or more heterogeneous clusters and invoke methods in the objects that model clusters to store the data collected from clusters. The cluster supervisor 404 may also be employed to present data and/or control information to clusters. For example, data stored in objects that model the clusters may be passed from the objects to the clusters to facilitate restarting clusters and/or reestablishing a lost state. Similarly, control information may be passed from the system 400 to the clusters to facilitate managing clusters.

A set of objects 430 (e.g., object 432, object 434, object 436) are available to the system 400. This set of objects 430 facilitates abstracting the heterogeneous and distinct clusters. Abstracting the similarities between clusters, and encapsulating cluster specific operations within vendor specific objects facilitates the cluster detector 402 and/or cluster supervisor 404 storing data in abstracting objects. To simplify object-based cluster management, the objects can be arranged in a hierarchy of objects that facilitates accessing objects individually and/or collectively. Furthermore, arranging the abstracting objects in a hierarchy facilitates inheritance and other object oriented programming techniques, which in turn simplifies programming associated with cluster management.

The cluster detector 402 and/or cluster supervisor 404 may receive data concerning the clusters from one or more intelligent, automated data gatherers. For example, neural network agents may substantially continuously traverse and/or monitor a network or networks on which one or more clusters may reside. Intelligent, automated data gatherers may identify clusters, cluster components, and/or resources associated with clusters and transmit data concerning the clusters to the cluster detector 402 and/or cluster supervisor 404.

Figure 5:
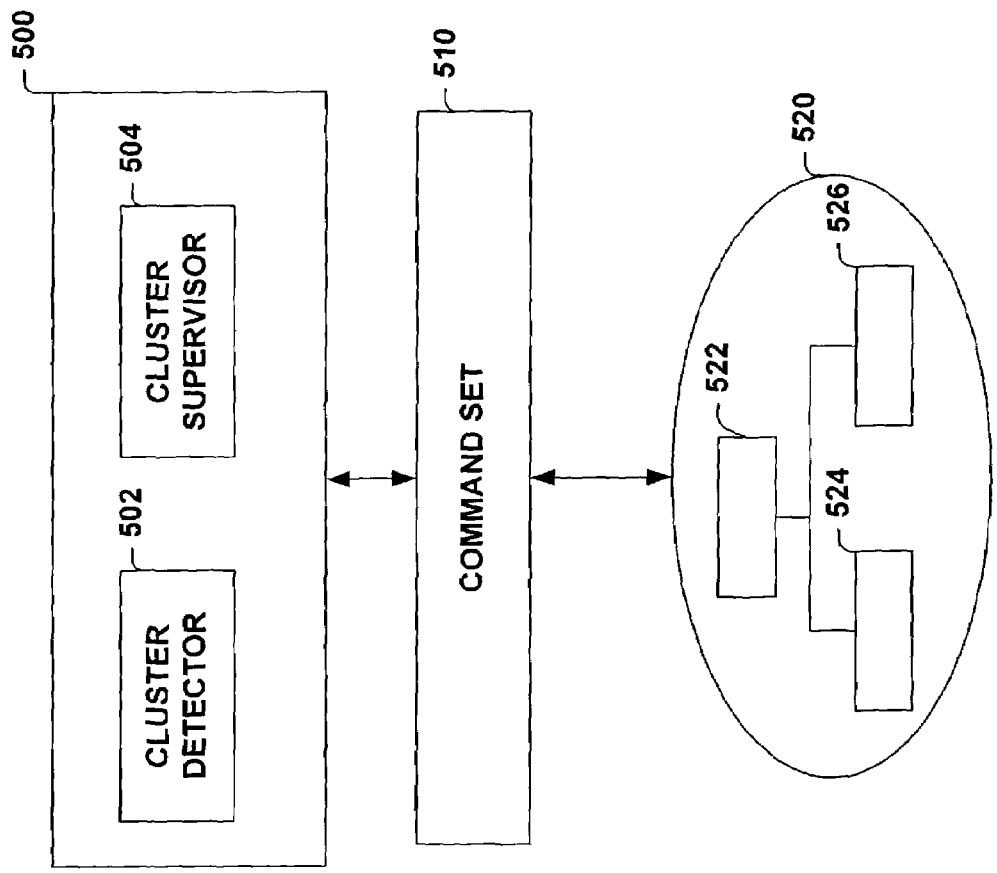
FIG. 5 illustrates an example system for facilitating interaction with heterogeneous cluster solutions that includes communicating via a standardized command set and a set of objects that model clusters and/or cluster components.

Turning now to FIG. 5, an object-based cluster management system 500 is illustrated communicating with a cluster 520 through a command set 510. Thus, a cluster detector 502 and/or a cluster supervisor 504 may communicate with the cluster 520 and/or individual cluster components (e.g., component 522, component 524, component 526) through the command set 510. Producing a command set 510 is facilitated by abstracting the similarities between clusters and/or cluster components and/or resources into objects that model such entities and by encapsulating the vendor specific attributes and functionality inside the objects. Providing a command set 510 simplifies programming a cluster detector 502 and/or cluster supervisor 504 since users of the cluster manager 500 are only required to become familiar with the command set 510 and not with the internal details of the objects communicated with through the command set 510.

In one example, the command set 510 includes commands that facilitate defining a cluster, defining a cluster component, viewing a cluster, viewing a cluster component, calling a function on a cluster, calling a function on a cluster component, invoking a process on a cluster, invoking a process on a cluster component, sending a command to a cluster, sending a command to a cluster component, starting a cluster, starting a cluster component, halting a cluster, halting a cluster component, starting a failover process, stopping a failover process, starting a maintenance process, stopping a maintenance process, starting a load balancing process, and stopping a load balancing process. Providing the command set 510 also facilitates producing new objects for newly created clusters, cluster components, and resources, which in turn facilitates more rapidly integrating such items with a cluster manager. Conventionally, when a new cluster was created, the vendor had few, if any, guidelines concerning interfaces to implement to simplify integration with cluster managers. Thus, if the cluster was to operate with the cluster manager, either the cluster had to be customized or the cluster manager had to be customized, which lead to increased complexity and cost. But with the abstracting objects and the command set 510, integration problems are reduced. Furthermore, with a pre-defined interface, clusters being developed can be simulated and thus integration testing can occur substantially in parallel with development, providing advantages over conventional systems.

While FIG. 5 illustrates the command set 510 residing between the object-based cluster manager 500 and the cluster 520, it is to be appreciated that sending commands to the cluster 520 and/or individual components (e.g., component 522, component 524, component 526), can be achieved by sending commands to objects that model clusters, cluster components, and/or resources. For example, while an object may model a cluster, the object may also be employed as the interface between an object-based cluster manager and the cluster. Thus, by sending a command to the object that is bound to a cluster, the desired effects of a command can in effect be sent to the cluster. Thus, so long as new clusters, cluster components, and/or resources implement the interface to the command set 510, new clusters, cluster components, and/or resources can interact with an existing object-based cluster manager 500 through the command set 510. This simplifies development and integration of new clusters, providing advantages over conventional systems.

Figure 6:
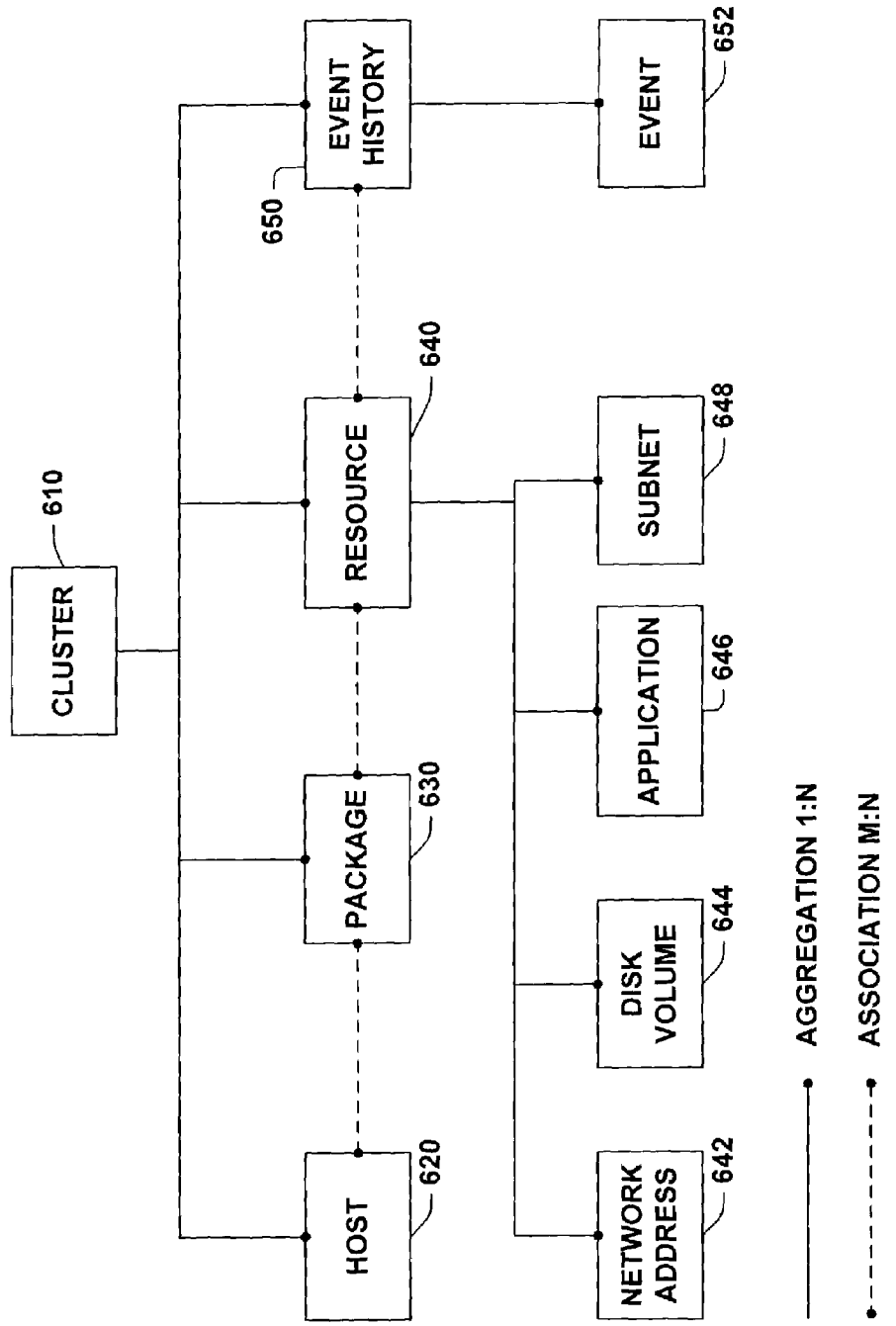
FIG. 6 illustrates an example hierarchy of objects that model clusters, resources, and/or cluster components.

Turning now to FIG. 6, an object hierarchy is illustrated. A "cluster object model" refers to a generic object model that describes cluster related objects and their interrelationships. Thus, a cluster object model facilitates providing a unified view of cluster membership, services, and various resources owned by a cluster. Similarly, a cluster object model is designed to cope with the dynamics of a cluster and can serve as a base class for deriving classes that are employed by a graphical user interface.

At the top of the hierarchy is a cluster object 610. The cluster object 610 can model a cluster and thus may include data that facilitates modeling the cluster, methods for manipulating cluster data, and methods for interacting with a command set and thus an object based cluster manager. In the hierarchy, a host object 620, a package object 630, a resource object 640, and an event history object 650 inherit from the cluster object 610. Similarly, objects that inherit from a resource object 640 include a network address object 642, a disk volume object 644, an application object 646, and a subnet object 648. Likewise, an event object 652 inherits from an event history object 650. The illustrated object hierarchy is one example of an object hierarchy that can be employed by an object based cluster management system to facilitate interacting with heterogeneous clusters. While FIG. 6 illustrates one possible object hierarchy, it is to be appreciated that other object hierarchies may be employed in accordance with this application. For example, one set of objects that facilitates object based cluster management can include a parent object that models a managed object, a cluster object that inherits from the parent object and models a cluster, and vendor specific cluster objects that inherit from the cluster object and model the vendor specific properties of a cluster (e.g., hardware, software, communication protocols). Arranging objects in a hierarchy simplifies programming associated with object based cluster management by facilitating reaping the benefits of object oriented analysis, design, and programming like inheritance, aggregation, data hiding, and encapsulation.

In one example set of objects employed with systems and methods for managing object based clusters, an agent object may be provided that inherits from the parent object and that models an agent. As discussed, an agent may traverse a computing environment locating clusters, cluster components and/or resources and reporting data concerning items to an object based cluster management system. The agents may be, for example, SNMP based or RMON based. Like new vendor specific clusters may be created, and like integrating the clusters with an object-based cluster manager is simplified by object modeling of clusters, so too can new cluster discovering and/or monitoring agents be created. Integrating agents is similarly simplified by modeling and abstracting the agents in objects, which includes defining an interface between objects and the object-based cluster manager. New agents that implement the interface can readily be integrated with the object-based cluster manager, providing advantages over conventional systems. Thus, the object hierarchy may include vendor specific agent objects that inherit from the agent object and model vendor specific agents. For example, a first vendor may provide an agent that identifies clusters provided by that vendor. Likewise, a second vendor may provide an agent that identifies not only clusters provided by that vendor but clusters provided by other vendors. Thus, both vendor specific agent objects may have unique capabilities, but both may inherit from the agent object that in turn inherits from the parent object, which facilitates object-based cluster management and rapid integration.

Another example object hierarchy includes a task space object that inherits from a parent object and models a task space. The example hierarchy can also include a task object that inherits from the parent object and models a task and one or more vendor specific task objects that inherit from the task object and model one or more vendor specific tasks. Similarly, an object hierarchy can include a resource space object that inherits from a parent object and models a resource space. Likewise, a resource object can inherit from a parent object and model a resource. Since resources can have widely differing data, methods, and other vendor specific uniqueness, implemented resource objects can inherit from a resource object and model items like services, processes, subnets, addresses, file systems, applications, and disk volumes, to facilitate incorporating such resources into an object-based cluster management system.

Since an object-based cluster manager may, in one example, interact with a graphical user interface that facilitates displaying information concerning clusters, cluster components, and/or resources, one example object hierarchy may include a folder object that inherits from a parent object and that facilitates a hierarchical display of objects in a graphical user interface. Similarly, a resource folder may inherit from the folder object and model a resource thus similarly facilitating a hierarchical display of objects in a graphical user interface employed to view clusters, cluster components, and/or resources. Furthermore, an example object hierarchy can include one or more implemented folder objects that inherit from the resource folder object and model items like a service folder, an address folder, a process folder, a subnet folder, a file system folder, an application folder, and a disk volume folder to similarly facilitate integrating an object-based cluster management system with a graphical user interface employed in, for example, enterprise management.

It is to be appreciated that a hierarchy of objects may be stored on a computer readable medium. Thus, a computer readable medium storing computer executable components of a set of objects can include a parent object that models a managed object, cluster objects that model clusters, vendor cluster objects that model vendor specific cluster solutions, agent objects that model agents, vendor specific agent objects that model vendor specific agents, task space objects that model task space, task objects that model tasks, vendor specific task objects that model vendor specific tasks, and so on.

Figure 7:
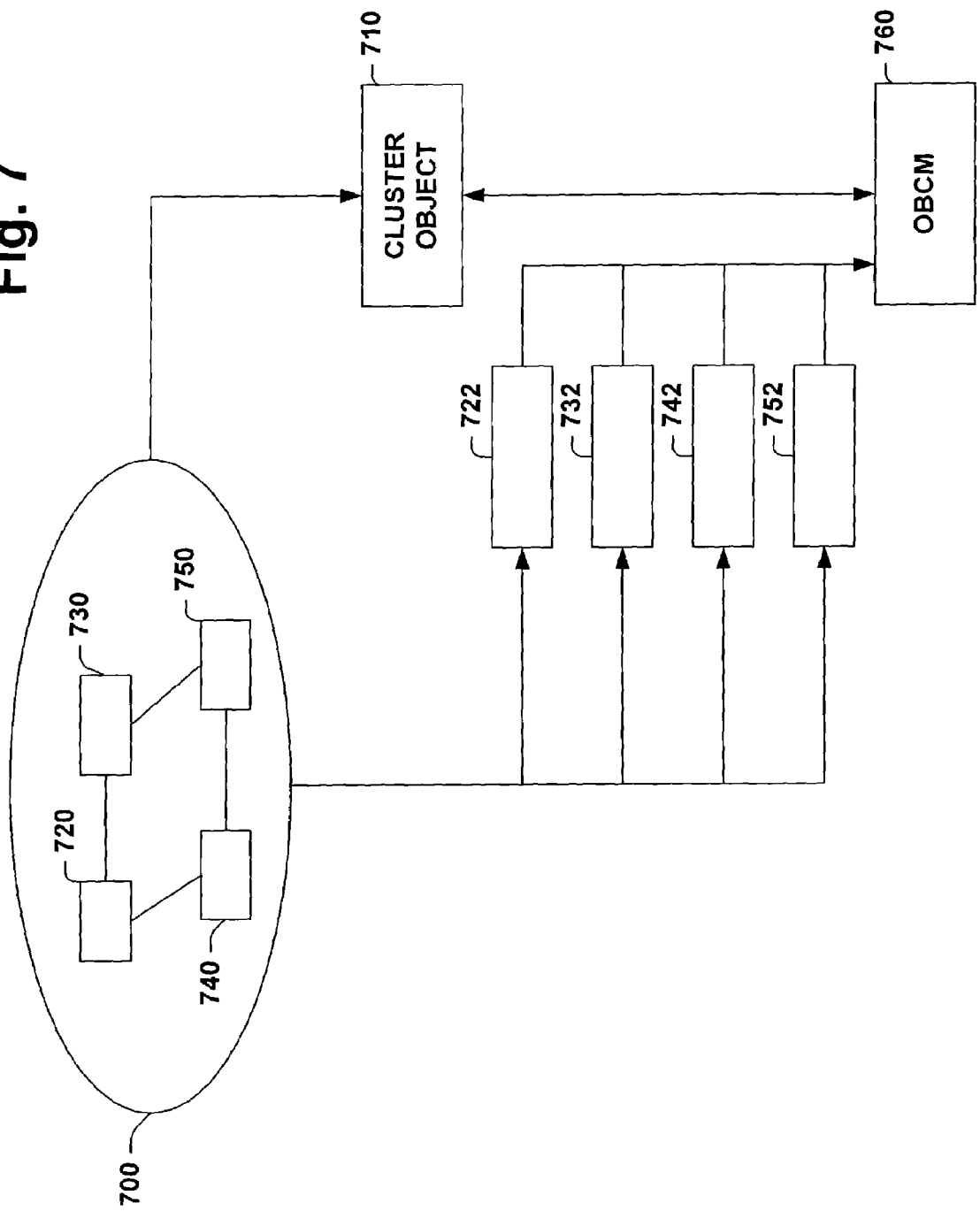
FIG. 7 illustrates an example object based cluster manager interacting with physical entities through cluster objects and resource objects that model physical entities.

Turning now to FIG. 7, a cluster 700 is illustrated being modeled by a cluster object 710 that is in communication with an object-based cluster management system 760. Similarly, individually cluster components 720, 730, 740, and 750 are illustrated being modeled respectively by individual objects 722, 732, 742, and 752, that are similarly in communication with the object based cluster management system 760. Thus, the object-based cluster management system 760 can interact with the cluster 700 and/or the individual cluster components 720-750 indirectly, through the modeling objects 710, 722-752. By abstracting the cluster 700 and/or the individual cluster components 720-750, the task of programming the object-based cluster management system 760 is simplified since the object-based cluster management system 760 is insulated from the vendor specific and/or implementation details associated with the cluster 700 and/or the cluster components 720-750. Another benefit of modeling the cluster 700 and components 720-750 is that items can be simulated in software, which facilitates rapid prototyping, rapid integration, fault detection, training, and substantially parallel development.

Figure 8:
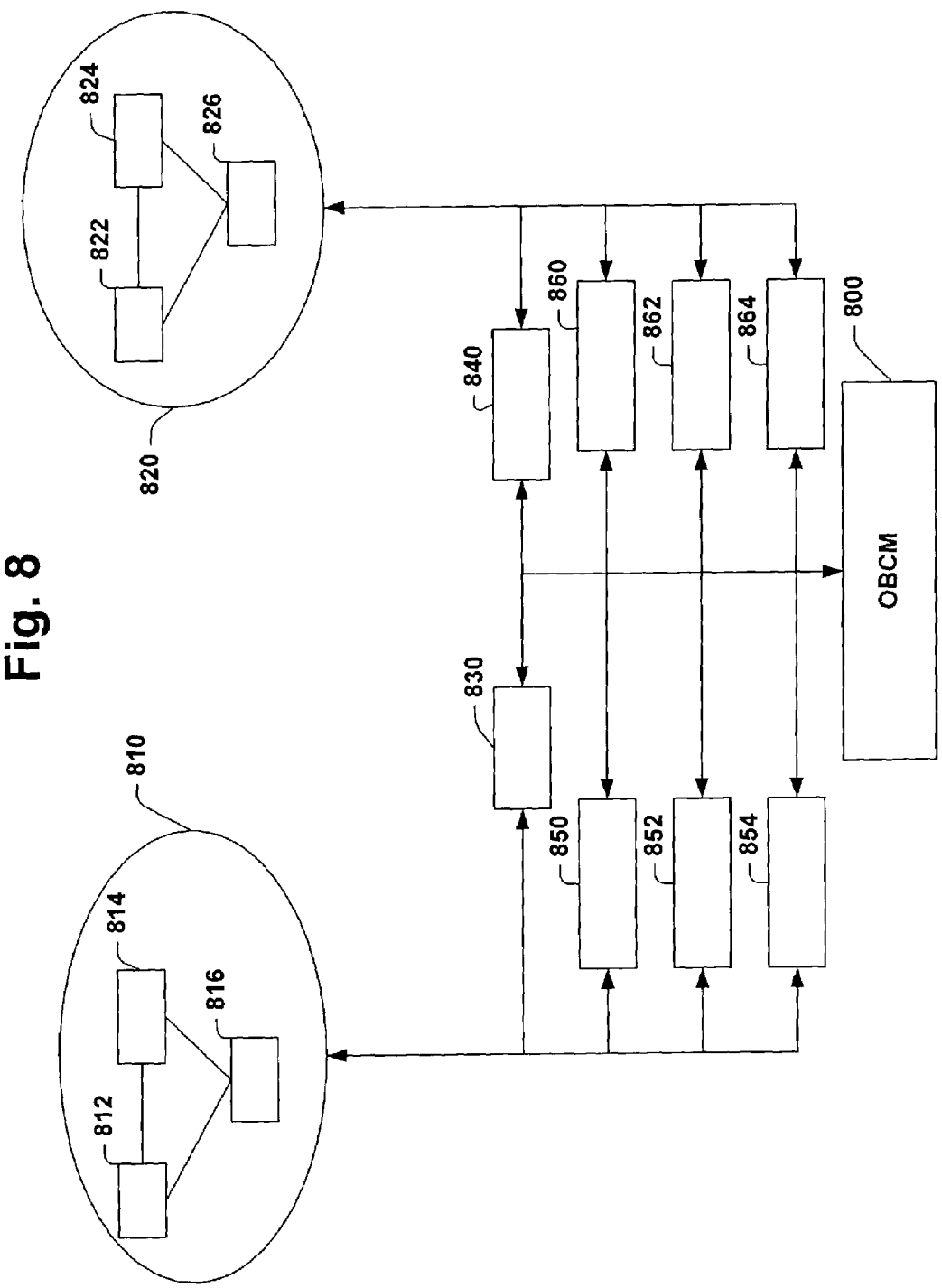
FIG. 8 illustrates an example object based cluster manager interacting with cluster objects and resource objects associated with multiple heterogeneous clusters.

In FIG. 8, an object-based cluster management system 800 is illustrated interacting with two heterogeneous clusters 810 and 820. Cluster 810 includes three cluster components 812, 814, and 816 that are respectively modeled by objects 850, 852, and 854. Similarly, cluster 820 includes components 822, 824, and 826 that are respectively modeled by objects 860, 862, and 864. Cluster 810 is modeled by object 830 and cluster 820 is in turn modeled by object 840. The objects 830, 840, 850, 852, 854, 860, 862, and 864 are illustrated in communication with the object-based cluster management system 800. Thus, the object-based cluster management system 800 is isolated from the vendor specific and/or implementation specific details associated with cluster 810, components 812, 814, 816, cluster 820, and components 822, 824, and 826. Therefore, programming the object-based management system 800 is simplified since it may interact with the abstractions captured in the objects rather than interacting with the specifics inherent in the physical entities, providing advantages over conventional non-object oriented systems.

Figure 9:
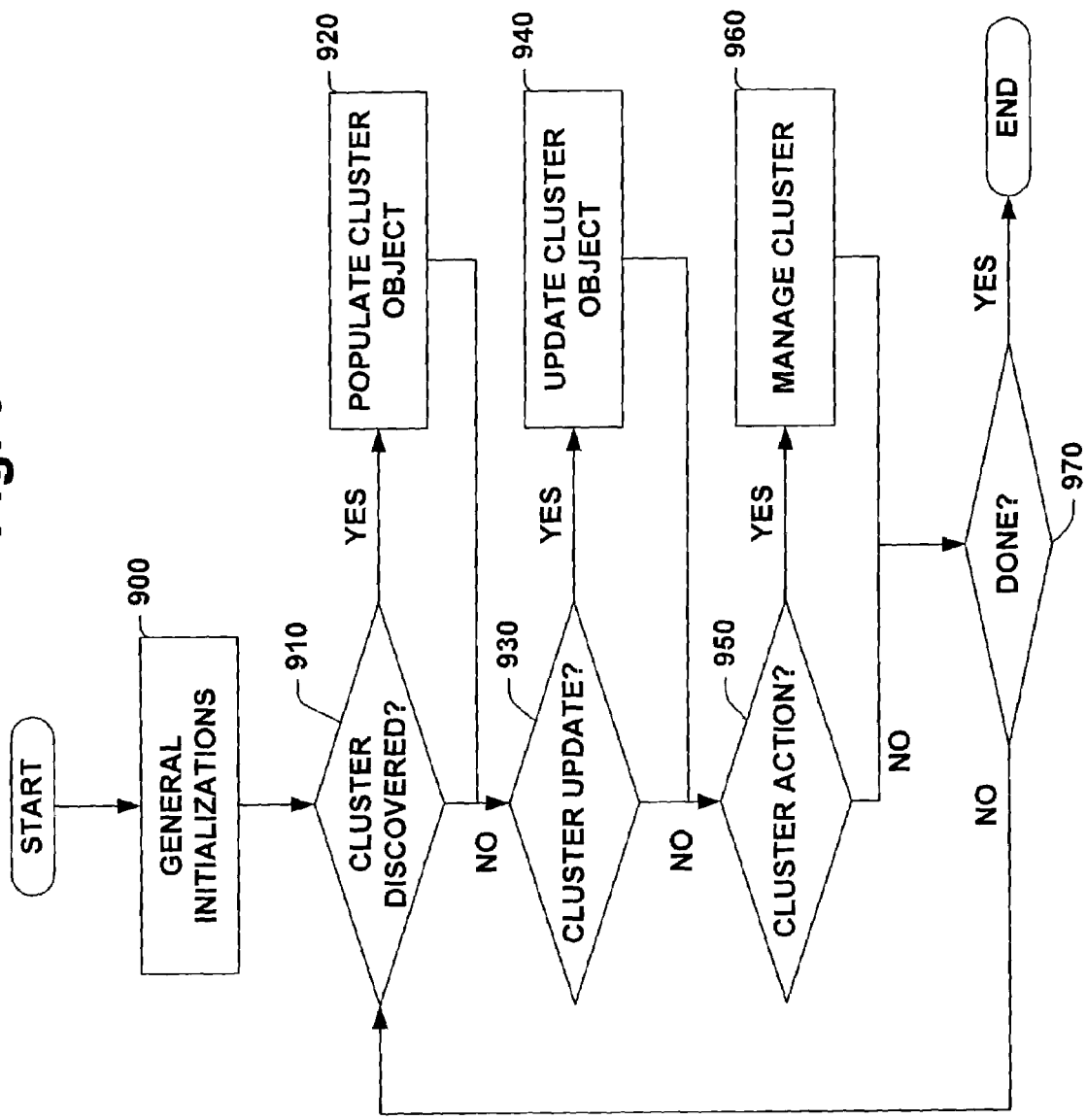
FIG. 9 is a flow chart illustrating an example method for managing object-based clusters.

In view of the exemplary systems shown and described above, methodologies that are implemented will be better appreciated with reference to the flow diagram of FIG. 9. While for purposes of simplicity of explanation, the illustrated methodology is shown and described as a series of blocks, it is to be appreciated that the methodology is not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks. In one example, such methodologies can be implemented as computer executable instructions and/or operations, which instructions and/or operations can be stored on computer readable media including, but not limited to, an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

FIG. 9 is a flow chart that illustrates an example computer-based method for managing object-based clusters. At 900, general initializations occur. The initializations can include, but are not limited to, allocating memory, establishing pointers, establishing data communications, acquiring resources, setting variables and displaying process activity.

At 910, a determination is made concerning whether a cluster has been discovered. If the determination at 910 is yes, then at 920 a cluster object is populated. Thus, in a method for managing object-based clusters, one of the first steps is to discover one or more clusters, which may be heterogeneous clusters (e.g., from different vendors). Discovering a cluster can include receiving and analyzing data from one or more agents, which in one example, may be neural network agents. The data received from the agents can include, but is not limited to, the name of a cluster, the location of a cluster, a set of cluster component identifiers, a set of relationships between cluster components, processes that can be performed by a cluster, commands that can be sent to a cluster, up time, down time, trap destinations, and locally available applications. Since clusters may be heterogeneous they may be abstracted and modeled by objects, which simplifies interactions with heterogeneous clusters. Data that is received from agents that discover the clusters can be stored in one or more data fields in an object that models a cluster. Typically the values are stored in objects that model a cluster by employing an interface of methods associated with the object.

Once one or more clusters have been discovered, resources associated with a cluster may also be discovered. Similar to how values associated with clusters can be stored in objects that model a cluster, values associated with resources may similarly be stored in objects that model a resource. Resources can include, but are not limited to, computer hardware (e.g., disk space, memory capacity, communications bandwidth, processor speed), and computer software (e.g., operating system, applications, processes, threads). The information concerning a resource can be received from an agent, which in one example can be a neural network agent.

Thus, an example method for managing object-based clusters can include discovering the clusters and/or resources associated with a cluster, storing values associated with clusters and/or resources in modeling objects, and receiving and analyzing data associated with the clusters and/or resources from neural network agents. Receiving data is facilitated by defining a cluster communication protocol. The protocol can include standards for cluster and/or resource data types, sizes, locations, and valid values. Since the agents (e.g., neural network agents) may continually seek out clusters, before data associated with clusters is stored in modeling objects, data may be analyzed to determine whether a newly "discovered" cluster has, in fact, been previously discovered. This simplifies reducing problems associated with duplicate data storage.

At 930, a determination is made whether information associated with a cluster should be updated. If the determination at 930 is yes, then at 940 a cluster object can be updated (e.g., values changed). Thus, an example method for managing object-based clusters can include monitoring the clusters and when changes in a cluster are noted, the data values in the modeling objects can be updated. Updating is typically performed by invoking one or more methods of objects that model a cluster. The monitor data can be received from monitoring agents, which in one example are neural network agents. For example, a newly discovered cluster may indicate that it has a first disk capacity. After a period of operation, disk capacity may change. Therefore, an agent that is monitoring clusters may report the new disk capacity. When the changed disk capacity is noticed, methods in objects that model clusters can be invoked to change the data values stored in the objects modeling the cluster. It is to be appreciated that in parallel processing systems that monitoring may occur substantially in parallel with updating of data values associated with clusters. While agents may monitor clusters, agents may also monitor resources associated with clusters. Therefore, a method for managing object based clusters can also include monitoring resources associated with clusters and updating values in objects that model resources. Data values employed to update objects that model a resource can be received from agents, which in one example may be neural network agents. Since the agents may substantially continually monitor resources and/or clusters, data received from agents may be analyzed prior to determining whether to invoke a method to update a value in a cluster and/or resource modeling object. This facilitates maintaining data integrity which in turn facilitates maintaining an accurate representation and model of clusters and/or related cluster resources.

At 950 a determination is made concerning whether an action is to be performed on a cluster. If the determination at 950 is yes, then at 960 the cluster may be managed. Managing a cluster can include, but is not limited to, defining a cluster, viewing a cluster, calling a system function on a cluster, calling a user function on a cluster, sending a command to a cluster, confirming an action to be performed on a cluster, starting a cluster, halting a cluster, registering a trap destination, listing a trap destination, listing an agent process, listing a cluster process, and launching a local application. Furthermore, managing a cluster can include performing failover processing for a cluster, load balancing within a cluster, and performing maintenance processing for a cluster. Defining a cluster can include, for example, providing identifiers for cluster components, and/or identifying the location of one or more cluster components. Viewing a cluster can include, for example, displaying one or more objects or data values stored in an object that are employed to model a cluster and/or a cluster resource. Since clusters can be cooperating sets of computer components, managing a cluster can include calling a system and/or user function on a cluster. For example, a cluster may have the ability to perform a security scan (e.g., virus checks) which would be considered a system function. Similarly, a cluster may have the ability to perform a program written by a user of the cluster, which would be a user function. System and/or user functions may be invoked, for example, by remote procedure calls. The "computer components" that can participate in a cluster include, but are not limited to, computer-related entities, either hardware, firmware, software, a combination thereof, or software in execution. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

Clusters may have state and thus clusters may be managed by starting the operation of a cluster and/or stopping the operation of a cluster. Starting and stopping clusters can be performed by, for example, sending commands to the cluster. Since actions that can be taken on clusters may depend on the state (e.g., up, down), viewing the state of a cluster can facilitate confirming whether an action can be performed on a cluster. Certain actions may be performed automatically when certain states exist in clusters or when certain state transitions occur in a cluster. Actions may be stored in trap destinations, therefore, a trap destination for a cluster can be registered by a method for managing object-based clusters, and such trap destinations may be listed. Since information concerning clusters is received from agents, cluster management can include listing the agent processes that have examined and/or reported information concerning clusters.

One application in which clusters are employed is in supporting highly available applications. Thus, cluster management can include performing failover processing for a cluster (e.g., automatically migrating processing from a down cluster component to an up cluster component), load balancing within a cluster (distributing processing and/or data between cluster components), and performing maintenance processing (e.g., defragmentation, communication integrity testing, security audits). This processing is facilitated by interacting with the objects that model the clusters, rather than with the physical entities directly.

Clusters and/or cluster components may interact with one or more cluster resources (e.g., disk, tape, CD). Thus, the application also concerns managing resources. Therefore, in an example method for managing object-based clusters, resource management functions including defining a resource, viewing a resource, starting and stopping a resource, and calling a function on a resource may be performed. For example, defining a resource can include a naming a resource, locating the resource, and associating the resource with one or more clusters. Similarly, viewing a resource may include displaying resource definition values. Like clusters, resources may have state, and therefore a resource may be started and/or halted. For example, a tape back up resource associated with a cluster may be employed to perform an automated tape back-up nightly between midnight and 1:00 a.m. Therefore, the resource may be started in anticipation of the automatic tape back-up and stopped after the completion of the automated tape back-up to facilitate saving electricity and to reduce security risks.

At 970, a determination is made concerning whether the management of object-based clusters is completed. If the determination at 970 is no, then processing returns to 910, otherwise processing can conclude. While the blocks shown in FIG. 9 are illustrated in sequence, it is to be appreciated that a method for managing object based clusters can be performed in parallel processing systems and therefore, the illustrated blocks may be performed substantially in parallel.

Figure 10:
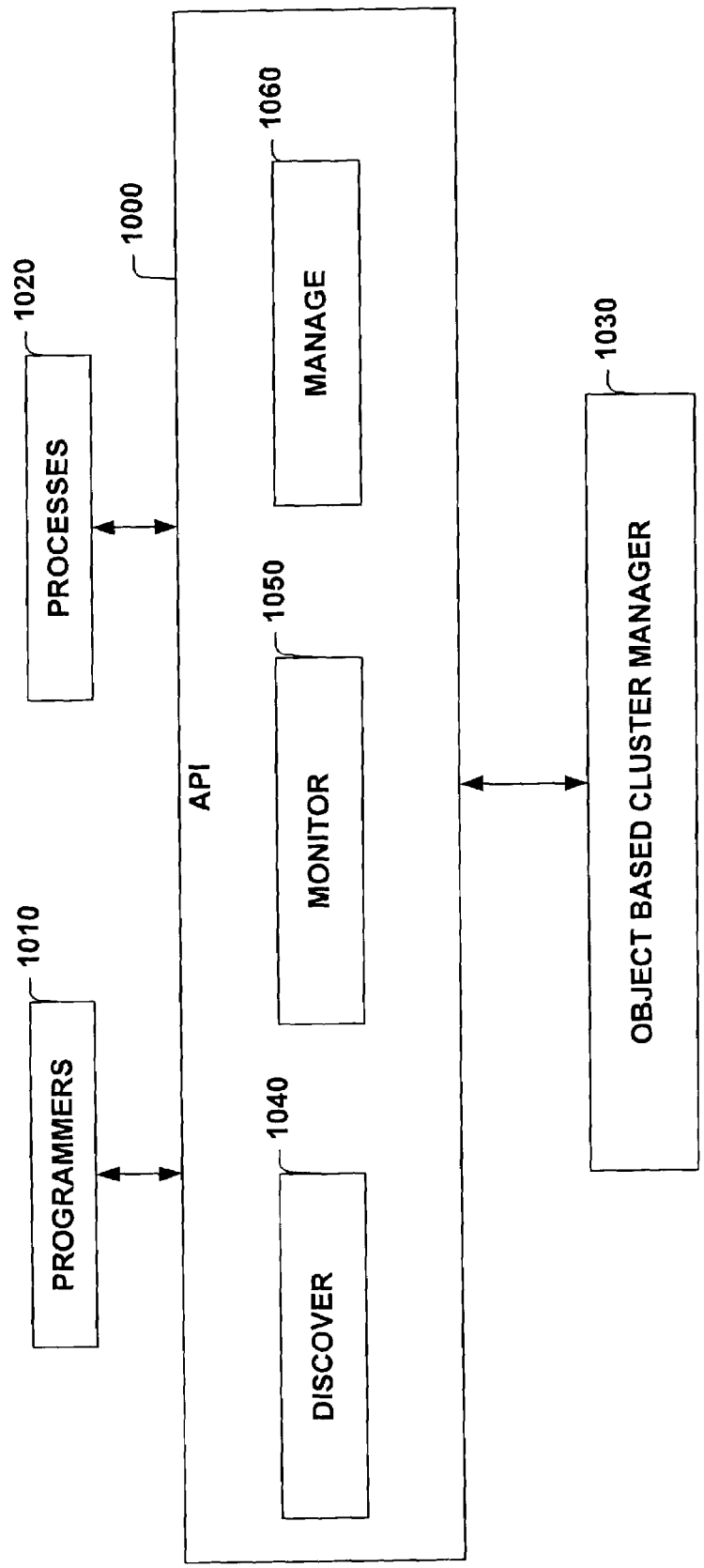
FIG. 10 illustrates an example application programming interface through which programmers and/or processes access a system and/or method for managing object based clusters.

Referring now to FIG. 10, an application programming interface (API) 1000 is illustrated providing access to an object-based cluster manager 1030. The API 1000 can be employed, for example, by programmers 1010 and/or processes 1020 to gain access to processing performed by the object-based cluster manager 1030. For example, a programmer 1010 can write a program to access a cluster (e.g., to invoke its operation, to monitor its operation, to access its functionality) where writing a program is facilitated by the presence of the API 1000. Thus, rather than the programmer 1010 having to understand the internals of the cluster manager 1030, the programmer's task is simplified by learning the interface 1000 to the cluster manager 1030. This facilitates encapsulating the functionality of the cluster manager 1030 while exposing that functionality to programmers 1010 and/or processes 1020. Similarly, the API 1000 can provide data values to the cluster manager 1030 and/or retrieve data values from the cluster manager 1030. For example, a process 1020 that facilitates load balancing may monitor the status of one or more clusters and/or cluster components by examining data retrieved through the API 1000 from the cluster manager 1030. When certain conditions, as represented by certain data values and/or relationships between values are noticed, the process 1020 may send one or more data values or commands that facilitate managing the load balancing through the API 1000.

In one example API 1000, a first interface 1040 passes application data and/or control data associated with discovering a cluster. By way of illustration, data including, but not limited to, the name, the location, the size, the address, the owner, the vendor, the capabilities of, and the member resources of a cluster may pass through the discovery interface 1040. "Cluster discovery" refers to the process of identifying cluster related objects on a network. The discovery can be, for example, Simple Network Management Protocol (SNMP) agent based or remote monitoring (RMON) agent based. In cluster discovery, correlating information gathered from different hosts is undertaken.

A second interface 1050 passes application data and/or control data associated with monitoring a cluster. For example, data including, but not limited to, cluster status, load, maintenance state, and utilization may pass through the monitor interface. A third interface 1060 passes application data and/or control data associated with managing a cluster. For example, data including, but not limited to, defining a cluster, defining a cluster component, viewing a cluster, viewing a cluster component, calling a function on a cluster, calling a function on a cluster component, invoking a process on a cluster, invoking a process on a cluster component, sending a command to a cluster, sending a command to a cluster component, starting a cluster, starting a cluster component, halting a cluster, halting a cluster component, starting a failover process, stopping a failover process, starting a maintenance process, stopping a maintenance process, starting a load balancing process, and stopping a load balancing process may pass through the interface 1060. Thus, in one example of the API 1000, a set of application program interfaces can be stored on a computer-readable medium. The interfaces can be executed by a computer component to gain access to an object based cluster manager. Interfaces can include, but are not limited to, a first interface that receives or provides data associated with discovering a cluster, a second interface that receives or provides data associated with monitoring a cluster, and a third interface that receives or provides data associated with managing a cluster.

What has been described above includes several examples. It is, of course, not possible to describe every conceivable combination of components or methodologies for purposes of describing the systems, methods, GUIs, and APIs employed in managing object-based clusters. However, one of ordinary skill in the art may recognize that further combinations and permutations are possible. Accordingly, this application is intended to embrace alterations, modifications, and variations that fall within the scope of the appended claims. Furthermore, to the extent that the term "includes" is employed in the detailed description or the claims, the term is intended to be inclusive in a manner similar to the term "comprising" as that term is interpreted when employed as a transitional word in a claim.

What is claimed is:

1. A computer-implemented method for managing object based clusters, comprising:
   receiving data associated with each of a plurality of clusters from one or more agents, wherein each cluster comprises a plurality of computer components;
   automatically identifying a cluster based on the received data;
   generating a cluster object set for the identified cluster, wherein the cluster object set comprises a cluster object that models the cluster and a vendor cluster object that inherits from the cluster object and models vendor specific solutions;
   storing, in an electronic memory, one or more values associated with the generated cluster object set; and
   managing the identified cluster based on the one or more values.

2. The method of claim 1, where identifying a cluster comprises analyzing data received from the one or more agents, each agent operable to discover one or more components associated with the cluster.

3. The method of claim 2, where the agents are neural network agents.

4. The method of claim 1, further comprising discovering one or more resources associated with one of the clusters and wherein storing one or more values associated with each of the clusters comprises storing, in an electronic memory, one or more values associated with the one or more resources associated with that cluster in one or more objects that model a resource.

5. The method of claim 4, where discovering a resource comprises receiving and analyzing data from one or more agents.

6. The method of claim 5, where the agents are neural network agents.

7. The method of claim 1, comprising:
   monitoring the one or more clusters; and
   updating one or more values associated with the one or more objects that model a cluster.

8. The method of claim 7, where updating the one or more values comprises invoking one or more methods of one or more objects that model a cluster.

9. The method of claim 7, where monitoring the one or more clusters comprises receiving and analyzing data from one or more agents.

10. The method of claim 9, where the agents are neural network agents.

11. The method of claim 7, comprising:
    monitoring one or more resources associated with the one or more clusters; and
    updating one or more values associated with one or more objects that model a resource.

12. The method of claim 11, where updating the one or more values comprises invoking one or more methods of one or more objects that model a resource.

13. The method of claim 11, where monitoring the one or more resources comprises receiving and analyzing data from one or more agents.

14. The method of claim 13, where the agents are neural network agents.

15. The method of claim 7, where managing the identified cluster comprises performing at least one of, defining a cluster, viewing a cluster, calling a system function on a cluster, calling a user function a cluster, sending a command to a cluster, confirming an action to be performed on a cluster, starting a cluster, halting a cluster, registering a trap destination, listing a trap destination, listing an agent process, listing a cluster process, and launching a local application.

16. The method of claim 7, where managing the identified cluster comprises performing at least one of, failover processing for a cluster, load balancing within a cluster, and maintenance processing for a cluster.

17. The method of claim 15, comprising managing one or more resources, where managing a resource comprises performing at least one of, defining a resource, viewing a resource, starting a resource, halting a resource, and calling a function on a resource.

18. A computer-readable medium storing computer-executable instructions that are operable, when executed by a computer, to:
    receive data associated with each of a plurality of clusters from one or more agents, wherein each cluster comprises a plurality of computer components;
    automatically identify a cluster based on the received data;
    generate a cluster object set for the identified cluster, wherein the cluster object set comprises a cluster object that models the cluster and a vendor cluster object that inherits from the cluster object and models vendor specific solutions;
    store, in an electronic memory, one or more values associated with the generated cluster object set; and
    manage the identified cluster based on the one or more values.

19. The computer-readable medium of claim 18, wherein the computer-executable instructions are operable to present at least one of data and control to the one or more clusters.

20. The computer-readable medium of claim 19, wherein the computer-executable instructions are operable to store data, in the electronic memory, in one or more objects that abstract at least one of a cluster and a cluster component.

21. The computer-readable medium of claim 20, where the one or more objects are arranged in an object hierarchy.

22. The computer-readable medium of claim 20, where the computer-executable instructions are operable to communicate with the one or more objects through a standardized, normalized command set.

23. The computer-readable medium of claim 22, where the command set comprises commands to perform at least one of, defining a cluster, defining a cluster component, viewing a cluster, viewing a cluster component, calling a function on a cluster, calling a function on a cluster component, invoking a process on a cluster, invoking a process on a cluster component, sending a command to a cluster, sending a command to a cluster component, starting a cluster, starting a cluster component, halting a cluster, halting a cluster component, starting a failover process, stopping a failover process, starting a maintenance process, stopping a maintenance process, starting a load balancing process, and stopping a load balancing process.

24. The computer-readable medium of claim 18, where the computer-executable instructions are operable to receive data from one or more intelligent, automated data gatherers.

25. A computer-implemented method for object-based cluster management (OCBM), comprising:
  receiving data associated with each of a plurality of a clusters from one or more agents, wherein each cluster comprises a plurality of computer components;
  automatically identifying a cluster based on the received data, wherein the cluster includes a plurality of computer components;
  generating a parent object that models a managed object;
  generating a cluster object that inherits from the parent object and models the identified cluster;
  generating one or more vendor cluster objects that inherit from the cluster object and model one or more vendor specific cluster solutions;
  storing the parent object, the cluster object, and the vendor cluster object in an electronic memory; and
  managing the identified cluster based on the vendor cluster object.

26. The method of claim 25, further comprising:
  generating an agent object that inherits from the parent object and models an agent;
  generating one or more vendor agent objects that inherit from the agent object and model one or more vendor specific agents; and
  storing the agent object and the vendor specific agents in the electronic memory.

27. The method of claim 25, further comprising:
  generating a task space object that inherits from the parent object and models a task space;
  generating a task object that inherits from the parent object and models a task;
  generating one or more vendor task objects that inherit from the task object and model one or more vendor specific tasks; and
  storing the task space object, the task object, and the vendor task objects in the electronic memory.

28. The method of claim 25, further comprising:
  generating a resource space object that inherits from the parent object and models a resource space;
  generating a resource object that inherits from the parent object and models a resource;
  generating one or more implemented resource objects that inherit from the resource object and model at least one of, a service, a process, a subnet, an address, a file system, an application, and a disk volume; and
  storing the resource space object, the resource object, and the implemented resource objects in the electronic memory.

29. The method of claim 25, further comprising:
  generating a folder object that inherits from the parent object and models a folder that facilitates a hierarchical display of objects in a graphical user interface;
  generating a resource folder object that inherits from the folder object and models a resource that facilitates a hierarchical display of objects in a graphical user interface;
  generating one or more implemented folder objects that inherit from the resource folder object and model at least one of, a service folder, an address folder, a process folder, a subnet folder, a file system folder, an application folder, and a disk volume folder; and
  storing the folder object, the resource folder object, and the implemented folder objects in the electronic memory.

30. A computer readable medium storing computer executable instructions that are operable, when executed by a computer, to:
  receive data associated with each of a plurality of clusters from one or more agents, wherein each cluster comprises a plurality of computer components;
  automatically identify a cluster based on the received data, wherein the cluster includes a plurality of computer components;
  generate a parent object that models a managed object;
  generate a cluster object that inherits from the parent object and models a cluster, wherein the cluster comprises a plurality of computer components;
  generate one or more vendor cluster objects that inherit from the cluster object and model one or more vendor specific cluster solutions;
  generate an agent object that inherits from the parent object and models an agent;
  generate one or more vendor agent objects that inherit from the agent object and model one or more vendor specific agents;
  generate a task space object that inherits from the parent object and models a task space;
  generate a task object that inherits from the parent object and models a task;
  generate one or more vendor task objects that inherit from the task object and model one ore more vendor specific tasks;
  generate a resource space object that inherits from the parent object and models a resource space;
  generate a resource object that inherits from the parent object and models a resource;
  generate one or more implemented resource objects that inherit from the resource object and model at least one of, a service, a process, a subnet, an address, a file system, an application, and a disk volume;
  generate a folder object that inherits from the parent object and models a folder that facilitates a hierarchical display of objects in a graphical user interface;
  generate a resource folder object that inherits from the folder object and models a folder that facilitates a hierarchical display in a graphical user interface;
  generate one or more implemented folder objects that inherit from the resource folder object and model at least one of, a service folder, an address folder, a process folder, a subnet folder, a file system folder, an application folder, and a disk volume folder;
  store the parent object, the cluster object, the vendor cluster objects, the agent object, the vendor agent objects, the task space object, the task object, the vendor task objects, the resource space object, the resource object, the implemented resource objects, the folder object, the resource folder object, and the implemented folder objects in an electronic memory; and
  manage the identified cluster based on the stored objects.

* * * * *